July 15, 1958

R. MENNESSON 2,842,858

DEVICES FOR MEASURING THE DIAMETER
OF A CYLINDRICAL BORE

Filed April 11, 1955

INVENTOR
Robert Mennesson
BY
Bailey, Stephens and Huettig
ATTORNEYS

United States Patent Office 2,842,858
Patented July 15, 1958

2,842,858
DEVICES FOR MEASURING THE DIAMETER OF A CYLINDRICAL BORE

Robert Mennesson, Neuilly-sur-Seine, France, assignor to Société d'Applications et de Constructions pour Materiel Automobile S. A. C. M. A., Neuilly-sur-Seine, France, a society of France Application April 11, 1955, Serial No. 500,479

Claims priority, application France April 24, 1954

1 Claim. (Cl. 33—178)

The present invention relates to devices for measuring the diameter of a cylindrical bore.

Known devices of this kind include contact members constituted by fingers guided radially with respect to the body of the device. The diameter of a given bore is obtained by measuring the axial displacements of a cone inserted between the inner ends of these fingers so as to bring the outer ends of said fingers into contact with the wall of the bore.

Such devices involve some drawbacks. In order to obviate these drawbacks it was proposed, in particular in the French Patent No. 1,061,292 filed by the Société d'Applications et de Constructions pour Matériel Automobile (S. A. C. M. A.), to replace the above mentioned radial fingers by three spheres radially guided in three directions respectively at 120° to one another about the axis of the device. Furthermore the above mentioned cone was replaced by a fourth sphere applied against the three first mentioned ones.

Such measurement devices, although constituting a substantial improvement over prior devices, are not wholly satisfactory when it is desired to make very accurate measurements. In particular, since there are three points of contact with the bore, such devices do not permit of detecting an oval shape of said bore.

The chief object of my invention is to provide improvements in measurement devices of the type including two contact members carried by a support including a cylindrical plug of an outer diameter slightly smaller than that of said bore, said contact members being guided radially with respect to said plug along a common line at right angles to the axis of said plug.

According to my invention, the contact members of such a device have at least their inner and outer surfaces of spherical shape and a central push-piece, slidable along said plug axis, cooperates with said contact members to force them outwardly against the wall of the bore to be measured, the section of said push-piece by the diametral plane in which said contact members are movably guided including two straight lines symmetrical with respect to said axis and tangent to the inner surfaces of said contact members.

Other features of my invention will become apparent in the course of the following description with reference to the appended drawings, given merely by way of example and in which.

Figure 1:
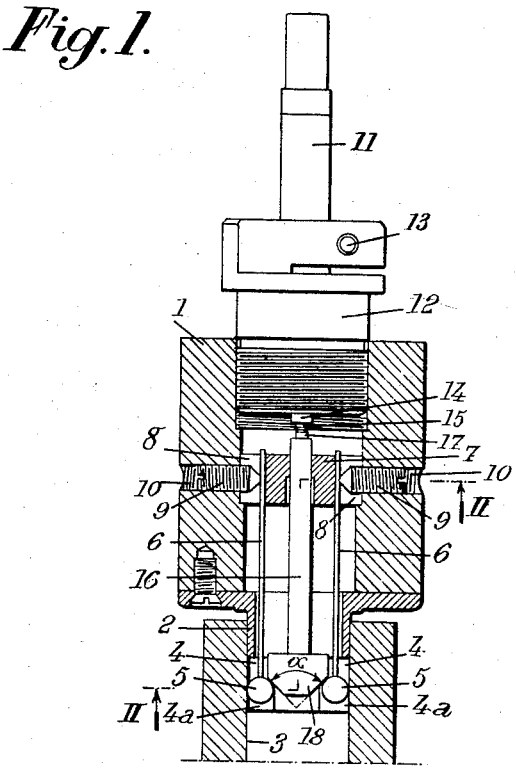
Fig. 1 is an axial sectional view of a device according to my invention.

The measurement device according to my invention includes a support constituted by a tubular body 1 carrying at one end thereof a cylindrical plug 2, preferably made of a hard material, and having an outer diameter a little smaller than that of the bore 3 to be measured so that said plug portion 2 can engage freely in said bore.

The contact members are constituted by two spheres 5 intended to bear against the wall 3 of the bore. Of course, it must be well understood that I might use contact members which are not wholly spherical but have their outer surfaces, that is to say their surfaces, that is to say their surfaces intended to come in contact with the wall 3, and their inner surfaces, that is to say their surfaces turned toward each other, of spherical shape. These contact members 5 are carried by flexible rods or strips such as 6, which are deformable in a substantially radial direction, that is to say in a common diametrical plane.

Said rods 6 are for instance fixed by means of an annular part 7 housed inside tubular body 1 and provided with two opposed notches 8 against the bottoms of which rods 6 can be fixed by screws 9 engaged in screw-threaded holes 10 provided in body 1 along a common diameter. These screws 9 thus make it possible to adjust the position of spherical members 5.

Spheres 5 are guided in two radial slots 4 provided in the lower end of plug 2, the middle plane of these two slots 4 coinciding with the plane containing screws 10.

The thickness of tubular plug 2 at the lower end thereof is such that said slots 4 have sides 4a capable of guiding spherical members 5 radially in a suitable fashion. Above this portion of plug 2, the thickness of said plug is reduced so as to allow for a sufficient radial displacement of rods 6 whereby each spherical member 5 can come into contact with the wall 3 of the bore.

Figure 2:
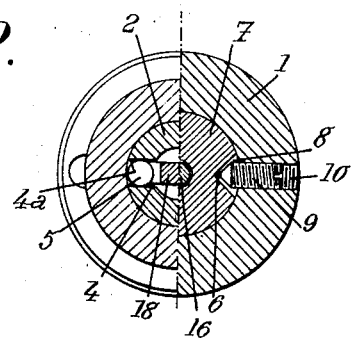
Fig. 2 is a section on the broken line II—II of Fig. 1.

A V-shaped piece 18 engages the inner surfaces of members 5 so as to push them outwardly against the wall 3 of the bore. The thickness of said push-piece 18 is advantageously at least approximately equal to the diameter of spherical members 5 (see Fig. 2), so that piece 18 is guided between the side walls 4a of slots 4.

The displacements of push-piece 18 in the direction of the axis of plug 2, from a given position, to the position necessary to bring the surfaces of members 5 into contact with the wall 3 of the bore make it possible to measure the exact diameter of said bore. These displacements are imparted to push-piece 18 by a vertical rod 16 guided in annular member 7 with a slight play sufficient to permit slight angular movements of said rod without wedging. The top end face 17 of rod 16 is in the form of a portion of a sphere and cooperates with the flat end 15 of a rod 14 belonging to a displacement amplifier 11. This amplifier is screwed in a support 12, itself screwed on the body 1 of the measurement device proper. Amplifier 11 is held in proper adjustment position by means of a tightening sleeve carried by support 12 and of a screw 13.

The side walls of piece 18 which cooperate with spherical members 5 are inclined toward each other so that the lower portion of said piece 18 is V-shaped, the angle $\alpha$ made by said inclined faces of piece 18 being preferably equal to 90° so that the longitudinal displacement of piece 18 is proportional to variations of the diameter of the bore.

It will be seen that in such a device slight radial displacements of the whole of members 5 and push-piece 18 has no influence upon the value that is measured.

The lower end of piece 18 may be cut off as shown by the drawing, same as the corresponding portions of pieces 5 (not shown), so as to permit of using the apparatus close to the bottom of a blind hole.

The advantage of the apparatus according to my invention is that measurements can be made in any diametral plane of the bore, whereby differences between said diameters make it possible to ascertain whether said bore is truly of circular cross section. Of course, rods 6 might be replaced by small strips bending only in the direction of the diametral plane in which are located the centres of spherical members 5. It will also be readily understood that the rod 14 of amplifier 11 might extend so as to bear directly upon push-piece 18.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A device for measuring the diameter of a cylindrical bore which comprises, in combination, a support including, rigid therewith, a cylindrical plug of a diameter slightly smaller than that of said bore, two identical contact members carried by said support symmetrically with respect to the axis of said cylindrical plug, said contact members being movably guided with respect to said support in a diametral plane of said plug, at least the inner portions of said contact members, i. e. those turned toward said axis, and their outer portions, i. e. those turned in the opposite directions, being spherical, means for preventing appreciable displacement of said members in the direction of said axis, a central push-piece axially guided in said support with some lateral play, said push-piece having a wedge-shaped head, the planes of the faces of the wedge formed by said head intersecting each other along a line at right angles to said diametral plane, and means for measuring the displacements of said push-piece with respect to said support in the direction of said axis.

References Cited in the file of this patent

UNITED STATES PATENTS

| | | |
|---|---|---|
| 2,369,319 | Smith | Feb. 13, 1945 |
| 2,642,672 | Lewis et al. | June 23, 1953 |
| 2,799,092 | Abramson | July 16, 1957 |

FOREIGN PATENTS

| | | |
|---|---|---|
| 519,551 | Great Britain | Mar. 29, 1940 |
| 218,397 | Switzerland | Apr. 16, 1942 |
| 482,794 | Italy | July 8, 1953 |
| 1,061,292 | France | Apr. 12, 1954 |
| 1,103,793 | France | June 1, 1955 |